(12) United States Patent
Schuler et al.

(10) Patent No.: US 9,936,360 B1
(45) Date of Patent: Apr. 3, 2018

(54) APPARATUS AND METHOD FOR REAL-TIME PUBLIC SAFETY EVIDENTIARY DATA COLLECTION

(71) Applicant: MOTOROLA SOLUTIONS, INC., Chicago, IL (US)

(72) Inventors: Francesca Schuler, Palatine, IL (US); Katrin Reitsma, Chicago, IL (US); Adam C. Lewis, Buffalo Grove, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/635,706

(22) Filed: Jun. 28, 2017

(51) Int. Cl.
| H04B 7/00 | (2006.01) |
| H04W 4/08 | (2009.01) |
| H04W 4/22 | (2009.01) |
| H04W 12/08 | (2009.01) |
| H04M 3/51 | (2006.01) |
| G06F 17/30 | (2006.01) |
| H04W 4/02 | (2018.01) |

(52) U.S. Cl.
CPC ........ *H04W 4/08* (2013.01); *G06F 17/30312* (2013.01); *H04M 3/5116* (2013.01); *H04W 4/22* (2013.01); *H04W 12/08* (2013.01); *G06F 17/30876* (2013.01); *H04W 4/023* (2013.01)

(58) Field of Classification Search
CPC ......... H04W 4/08; H04W 4/22; H04W 12/08; H04W 4/023; G06F 17/30312; G06F 17/30876; H04M 3/5116
See application file for complete search history.

(56) References Cited

U.S. PATENT DOCUMENTS

| 8,116,243 B2 | 2/2012 | Zhiying et al. |
| 8,977,373 B2 | 3/2015 | Felty et al. |
| 8,995,946 B2* | 3/2015 | Miller .................... G06Q 10/06 |
| | | 455/404.1 |
| 9,225,793 B2 | 12/2015 | Dutta et al. |
| 9,306,965 B1 | 4/2016 | Grossman et al. |
| 9,373,014 B1* | 6/2016 | Mehranfar ............ H04W 4/008 |

(Continued)

OTHER PUBLICATIONS

Ibarguengoytia, P. H., Sucar, L. E., & Vadera, S. (2001). Real time intelligent sensor validation. IEEE Transactions on Power Systems, 16(4), 770-775.

*Primary Examiner* — Dominic Rego
(74) *Attorney, Agent, or Firm* — Perry + Currier, Inc.

(57) ABSTRACT

An evidentiary electronic processor receives identifying data associated with respective ones of a plurality of communication devices associated with an incident. The evidentiary electronic processor determines an assignment status of each communication device using the respective identifying data. The assignment status indicates that a communication device is one of assigned to the incident, unassigned to the incident and associated with a first profile that is relevant to the incident, or unassigned to the incident and associated with a second profile that is irrelevant to the incident. The evidentiary electronic processor receives sensor data associated with the incident from a sending communication device out of the plurality of communication devices. The evidentiary electronic processor processes the sensor data based on a respective assignment status associated with the sending communication device.

20 Claims, 7 Drawing Sheets

(56) References Cited

U.S. PATENT DOCUMENTS

| | | | | |
|---|---|---|---|---|
| 9,794,755 B1* | 10/2017 | South | .................. | H04W 4/04 |
| 2008/0042825 A1* | 2/2008 | Denny | .................. | G08G 1/205 |
| | | | | 340/522 |
| 2012/0115494 A1* | 5/2012 | Christensen | ............ | H04W 4/08 |
| | | | | 455/450 |
| 2015/0145696 A1* | 5/2015 | Seo | .................. | H04W 4/14 |
| | | | | 340/905 |
| 2015/0319176 A1 | 11/2015 | Yahalom et al. | | |
| 2016/0150366 A1* | 5/2016 | Miller | .................. | H04W 4/021 |
| | | | | 455/456.4 |

* cited by examiner

APPARATUS AND METHOD FOR REAL-TIME PUBLIC SAFETY EVIDENTIARY DATA COLLECTION

BACKGROUND OF THE INVENTION

Members of an organization may be assigned to a talkgroup so that all members in the talkgroup can share information, using communication devices and the like. For example, firefighters in one or more departments may be assigned to a firefighter talkgroup and police officers in one or more departments may be assigned to a police talkgroup. Public safety responders affiliated with multiple talkgroups may respond to an incident. In some cases, only some responders in a given talkgroup may be assigned to the incident. In these cases, the unassigned responders in the talkgroup may still be able to monitor the talkgroup communications but are unable to upload data related to the incident. However, the unassigned responders may have relevant data associated with the incident.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
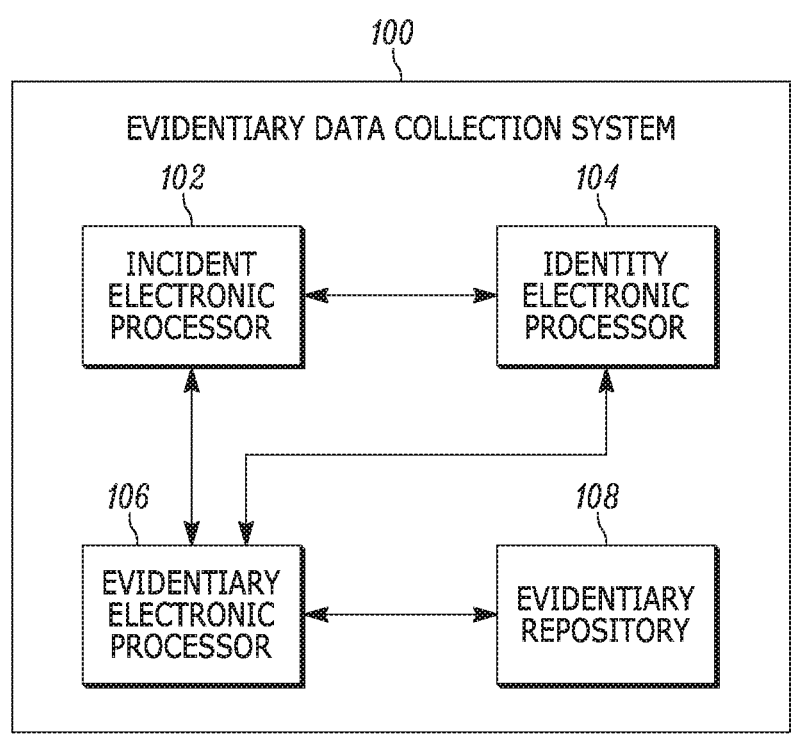
FIG. 1 is a block diagram of an evidentiary data collection system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to apparatuses and methods for collecting incident data. An evidentiary electronic processor receives identifying data associated with respective ones of a plurality of communication devices associated with an incident. The evidentiary electronic processor determines an assignment status of each communication device using the respective identifying data. The assignment status indicates that a communication device is one of assigned to the incident, unassigned to the incident and associated with a first profile that is relevant to the incident, or unassigned to the incident and associated with a second profile that is irrelevant to the incident. The evidentiary electronic processor receives sensor data associated with the incident from a sending communication device out of the plurality of communication devices. The evidentiary electronic processor processes the sensor data based on a respective assignment status associated with the sending communication device.

FIG. 1 is a block diagram of an evidentiary data collection system used in accordance with some embodiments. Evidentiary data collection system 100 includes a plurality of electronic processors including an incident electronic processor 102 (also described herein as a first electronic processor 102), an identity electronic processor 104 (also described herein as a second electronic processor 104), an evidentiary electronic processor 106 (also described herein as a third electronic processor 106) and an evidentiary repository 108. Evidentiary repository 108 is configured to store relevant and evidentiary data uploaded by public safety responders and related to an incident. Information may be uploaded into evidentiary repository 108 by public safety responders using one or more communication devices (for example, devices 202-230 shown in FIG. 2). The communication devices may be, for example, portable two-way radios, mobile radios or devices including sensors that are configured to communicate with each other and/or with components of evidentiary data collection system 100.

Incident electronic processor 102 may be a computer assisted dispatcher or another system controller or dispatcher configured to assign public safety responders to an incident. In assigning public safety responders to the incident, incident electronic processor 102 is further configured to associate an assignment status to respective public safety responders, wherein the assignment status indicates that a public safety responder is assigned to the incident or unassigned to the incident. In associating a public safety responder with an assignment status, the respective communication device(s) of the public safety responder are also associated with the assignment status. Incident electronic processor 102 may form an incident group including the public safety responders assigned to the incident, wherein public safety responders from different talkgroups may be assigned to the incident group and the talkgroups assigned to the incident may be from different agencies. Each talkgroup is a communication group wherein all members in the talkgroup may use assigned communication devices to share information with each other.

Identity electronic processor 104 is configured to create and issue access tokens to public safety responders that have been successfully authenticated. Evidentiary electronic processor 106 is configured to determine the assignment statuses of public safety responders and validate the access tokens and the assignment statuses of public safety responders attempting to upload information to evidentiary repository 108. Evidentiary electronic processor 106 is also configured to determine whether or not information presented by public safety responders is to be uploaded into evidentiary repository 108. Evidentiary repository 108 and processors 102-106 may be implemented, for example, in a single device within evidentiary data collection system 100 or may be distributed in multiple devices (for example, servers and/or communication devices).

Figure 2:
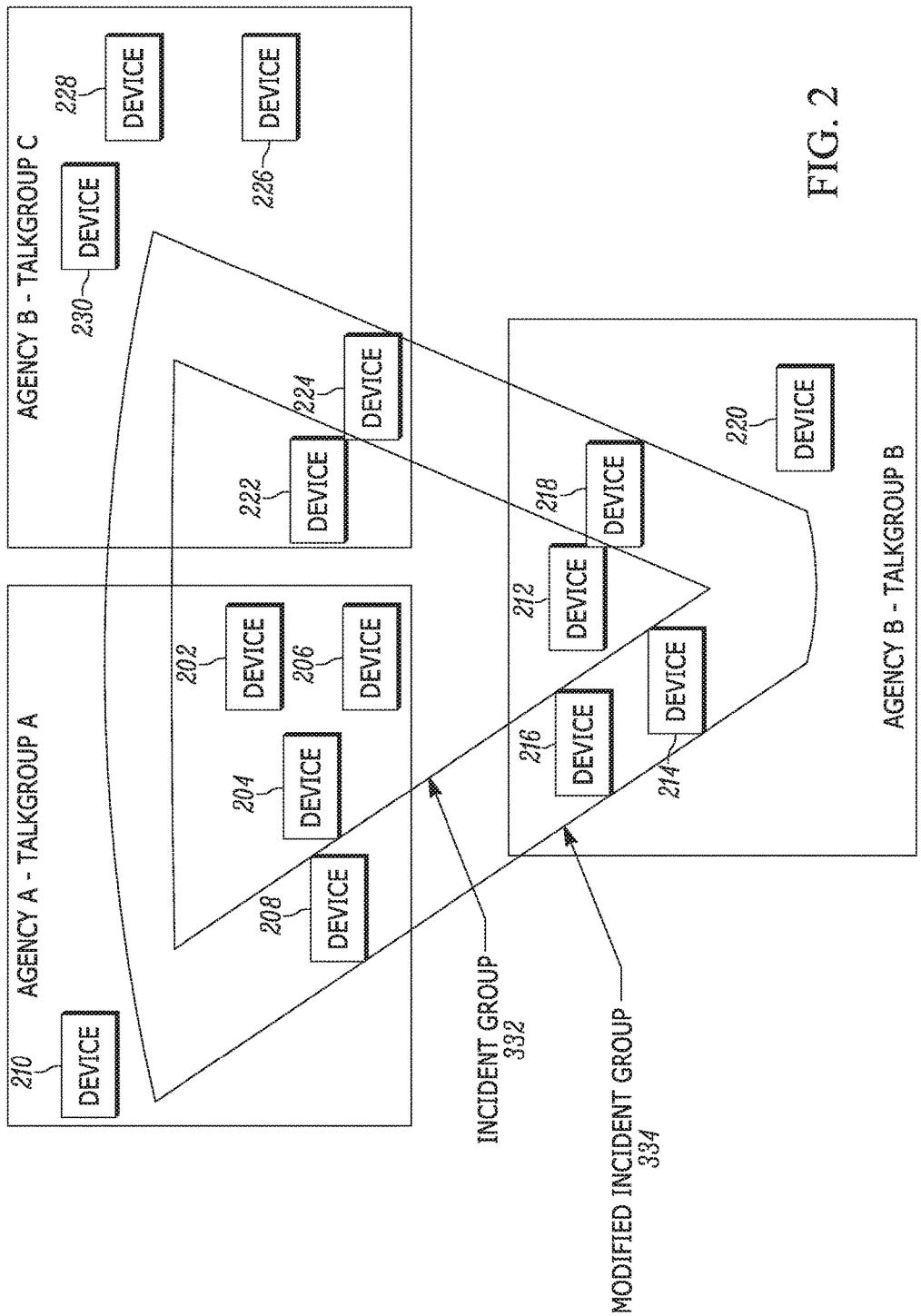
FIG. 2 is a block diagram depicting talkgroups associated with an incident in accordance with some embodiments.

FIG. 2 is a block diagram depicting talkgroups associated with an incident in accordance with some embodiments. Communication devices 202-210, associated with public safety responders in agency A, may be assigned to talkgroup A; communication devices 212-220, associated with public safety responders in agency B, may be assigned to talkgroup B; and communication devices 222-230, also associated with public safety responders in agency B, may be assigned to talkgroup C.

Depending on one or more criteria, for example, depending on the geographic proximity of public safety responders to the incident, incident electronic processor 102 may assign public safety responders associated with communication devices 202-206 from talkgroup A, public safety responder associated with communication device 212 from talkgroup B and public safety responder associated with communication device 222 from talkgroup C to an incident group 332.

Incident electronic processor 102 is configured to send identifying data associated with respective communication devices in talkgroups A, B and/or C to evidentiary electronic processor 106. For example, incident electronic processor 102 may send, to evidentiary electronic processor 106, one or more of identifiers associated with each communication device in talkgroups A, B and/or C, the assignment statuses of the public safety responder associated with each communication device in talkgroups A, B and/or C (i.e., whether or not an associated public safety responder is assigned to incident group 332 or unassigned), an identifier for the incident, the type of the incident, the geographic location of the incident, the geographic location of each public safety responder in talkgroups A, B and/or C, capabilities of the communication devices associated with public safety responders in talkgroups A, B and/or C, and/or the identifiers of the public safety responders, talkgroups, roles and/or agencies associated with the incident.

Based on information received from incident electronic processor 102, evidentiary electronic processor 106 may determine whether the unassigned public safety responders are associated with a first profile or a second profile, wherein the first profile may include information considered relevant to the incident and the second profile may include information considered irrelevant to the incident. For example, evidentiary electronic processor 106 may determine whether one or more unassigned public safety responders are within close geographic proximity to an incident area and/or are associated with assignments or roles that may include information considered relevant to the incident, and if so, evidentiary electronic processor 106 may associate those unassigned public safety responders with the first profile. Evidentiary electronic processor 106 may also determine whether one or more unassigned public safety responders are associated with assignments, roles or geographic locations that are not likely to include information considered relevant to the incident, and if so, may associate those public safety responders with the second profile. The first and second profiles may specify, for example, a public safety responder's assignment, role or geographic location.

Consider, for example, that public safety responders associated with communication device 208 from talkgroup A, communication devices 214-218 from talkgroup B and communication device 224 from talkgroup C are not assigned to incident group 332 but are associated with the first profile because of, for example, their geographic proximity to the incident area. In order to enable the public safety responders associated with these communication devices to upload information that is relevant to the incident to evidentiary repository 108, evidentiary electronic processor 106 may form a modified incident group 334 including the public safety responders associated with communication device 208 from talkgroup A, communication devices 214-218 from talkgroup B and communication device 224 from talkgroup C. Public safety responders associated with communication devices 210, 220 and 226-230, although still a part of talkgroups A, B and C, remain unassigned and are associated with the second profile because of, for example, their geographic proximity to the incident area. Evidentiary electronic processor 106 may therefore determine that these public safety responders are not likely to upload relevant data for the incident to evidentiary repository 108.

Using the identifying data received from incident electronic processor 102 and the association of unassigned communication devices to the first profile or the second profile, evidentiary electronic processor 106 may determine the assignment status of each public safety responder in talkgroups A, B and C, i.e., evidentiary electronic processor 106 may determine whether or not each public safety responder associated with one or more communication devices is assigned to incident group 332, to modified incident group 334, or is unassigned. Evidentiary electronic processor 106 may send the assignment statuses associated with the communication devices to the incident electronic processor 102 and incident electronic processor 102 may send information to the communication devices informing a communication device of its assignment status. Subsequent to receiving the assignment statuses from evidentiary electronic processor 106, incident electronic processor 102 and/or the communication devices receiving information from incident electronic processor 102 may request an access token, wherein the information a communication device receives from incident electronic processor 102 may include the assignment status of the communication device and access information on how the communication device assigned to the incident group 332 or the modified incident group 334 may access identity electronic processor 104 to request the access token. The access information may include, for example, an address of identity electronic processor 104. The access token is associated with a public safety responder and an affiliated agency and the access token is granted to a public safety responder that is associated with incident group 332 or modified incident group 334. The access token authorizes an application client on a communication device to upload data to evidentiary repository 108 on behalf of an associated public safety responder.

If an access token is to be generated for members of a talkgroup or organization assigned to incident group 332, incident electronic processor 102 identifies public safety responders in that talkgroup or organization that are assigned to incident group 332, generates incident group information for those public safety responders and transmits the incident group information to the associated communications devices. If an access token is to be generated for members of a talkgroup or organization assigned to modified incident group 334, incident electronic processor 102 identifies public safety responders in that talkgroup or organization that are assigned to modified incident group 334, generates modified group information for those public safety responders and transmits the modified group information to the associated communications devices. In generating the incident group information and/or the modified group information, incident electronic processor 102 signs a grant with its private key, wherein the grant is a message provided to the communication devices associated with the incident group information and/or the modified group information and enables these devices to obtain the access token from identity electronic processor 104

In cases where the access token is for incident group 332, incident electronic processor 102 transmits the signed grant and the address for identity electronic processor 104 to communication devices associated with public safety responders in incident group 332 in the talkgroup or organization. The address for identity electronic processor 104 may be, for example, an Internet Protocol (IP) or a uniform resource locator (URL) associated with identity electronic processor 104. Similarly, in cases where the access token is for modified incident group 334, incident electronic processor 102 transmits the signed grant and the address for identity electronic processor 104 to communication devices associated with public safety responders in modified incident group 334 in the talkgroup or organization.

A communication device receiving the signed grant creates a token request and sends the token request to identity electronic processor 104, using the address for identity electronic processor 104 received from incident electronic processor 102. Based on the token request, identity electronic processor 104 generates an access token for incident group 332 or for modified incident group 334 for the talkgroup or organization and transmits the access token to the requesting communication device. The access token authorizes application clients on communication devices in incident group 332 or modified incident group 334 in the talkgroup or organization to upload information to evidentiary repository 108.

Communication devices 202-230 may upload sensor data to evidentiary repository 108 by sending the sensor data to evidentiary electronic processor 106. Examples of sensor data sent to evidentiary electronic processor 106 may include data generated on communication devices 202-230 including, for example, videos, photos, audio recordings or other data generated on communication devices 202-230 or data generated or obtained from sensors on communication devices 202-230. The sensor data may also include data obtained by communication devices 202-230 from external sources. For example, the sensor data may include a video feed from an external source received by a communication device. The sensor data may be sent with meta-data including, for example, the talkgroup identifier, location information, the incident identifier, an agency identifier, an associated public safety responder identifier and additional available context information. In some embodiments, evidentiary electronic processor 106 may generate the meta-data, if it is not sent with the sensor data.

A sending communication device uploading the sensor data to evidentiary repository 108 may transmit the access token with the sensor data and the meta-data. Subsequent to receiving the sensor data, evidentiary electronic processor 106 may determine if the sensor data is transmitted with a valid access token. If evidentiary electronic processor 106 determines that sensor data includes a valid access token, evidentiary electronic processor 106 is configured to determine that the sending communication device is authorized to upload relevant sensor data for the incident. Evidentiary electronic processor 106 may further determine the evidentiary level of the sensor data, for example, by calculating an evidentiary reliability index for the sensor data. The evidentiary reliability index may be calculated using, for example, hardware or software properties associated with the device uploading the sensor data and/or hardware or software properties associated with other devices uploading related and relevant sensor data. Evidentiary electronic processor 106 may determine that the sensor data is at an evidentiary level if the calculated evidentiary reliability index is above a first threshold, wherein the relevance for sensor data associated with a calculated evidentiary reliability index above the first threshold may be considered higher than the relevance for sensor data associated with a calculated evidentiary reliability index below the first threshold.

Evidentiary electronic processor 106 may process the sensor data from authorized or unauthorized communication devices based on the assignment status of the sending communication device and one or more predefined policies. For example, if evidentiary electronic processor 106 calculates the evidentiary reliability index, evidentiary electronic processor 106 may upload the meta-data, the sensor data and the evidentiary reliability index to evidentiary repository 108. If evidentiary electronic processor 106 does not calculate the evidentiary reliability index and determines that a communication device is authorized to upload the sensor data for the incident, evidentiary electronic processor 106 may upload the meta-data and the sensor data to evidentiary repository 108.

In another example, if evidentiary electronic processor 106 determines that the sending communication device is not authorized to upload sensor data for the incident, evidentiary electronic processor 106 may discard the sensor data or evidentiary electronic processor 106 may upload the sensor data according to a predefined policy. For example, evidentiary electronic processor 106 may upload the sensor data without including the talkgroup identifier and/or the incident identifier with the uploaded sensor data. In another example, when the assignment status of the sending communication device is unassigned to the incident and associated with the second profile, evidentiary electronic processor 106 may upload the sensor data and a value below a predefined threshold.

Evidentiary electronic processor 106 may also use the evidentiary reliability index to execute one or more predefined policies. For example, if the evidentiary reliability index is above the first threshold, subsequent to uploading the sensor data to evidentiary repository 108, evidentiary electronic processor 106 may disseminate the sensor data to communication devices in the incident area. In another example, if the evidentiary reliability index is below the first threshold, subsequent to uploading the sensor data, evidentiary electronic processor 106 may transmit the sensor data via direct mode to communication devices within a predefined vicinity of the sending communication device.

Subsequent to updating evidentiary repository 108 with sensor data from authorized devices, i.e., communication devices transmitting a valid access token with the sensor data and associated with incident group 332 or with modified incident group 334, evidentiary electronic processor 106 may execute one or more policies associated with uploading relevant incident data. For example, evidentiary electronic processor 106 may disseminate the sensor data to members of talkgroups A, B, and/or C and/or notify members of talkgroups A, B, and/or C.

When the sensor data is uploaded into evidentiary repository 108, the meta-data associated with the sensor data may be used to search evidentiary repository 108 for the sensor data. For example, during post incident analysis, the talkgroup identifier and/or the incident identifier may be transmitted in a query request in order for a forensic analyst to search the meta-data associated with the sensor data and retrieve relevant and/or evidentiary information associated with the incident from evidentiary repository 108.

Figure 3A:
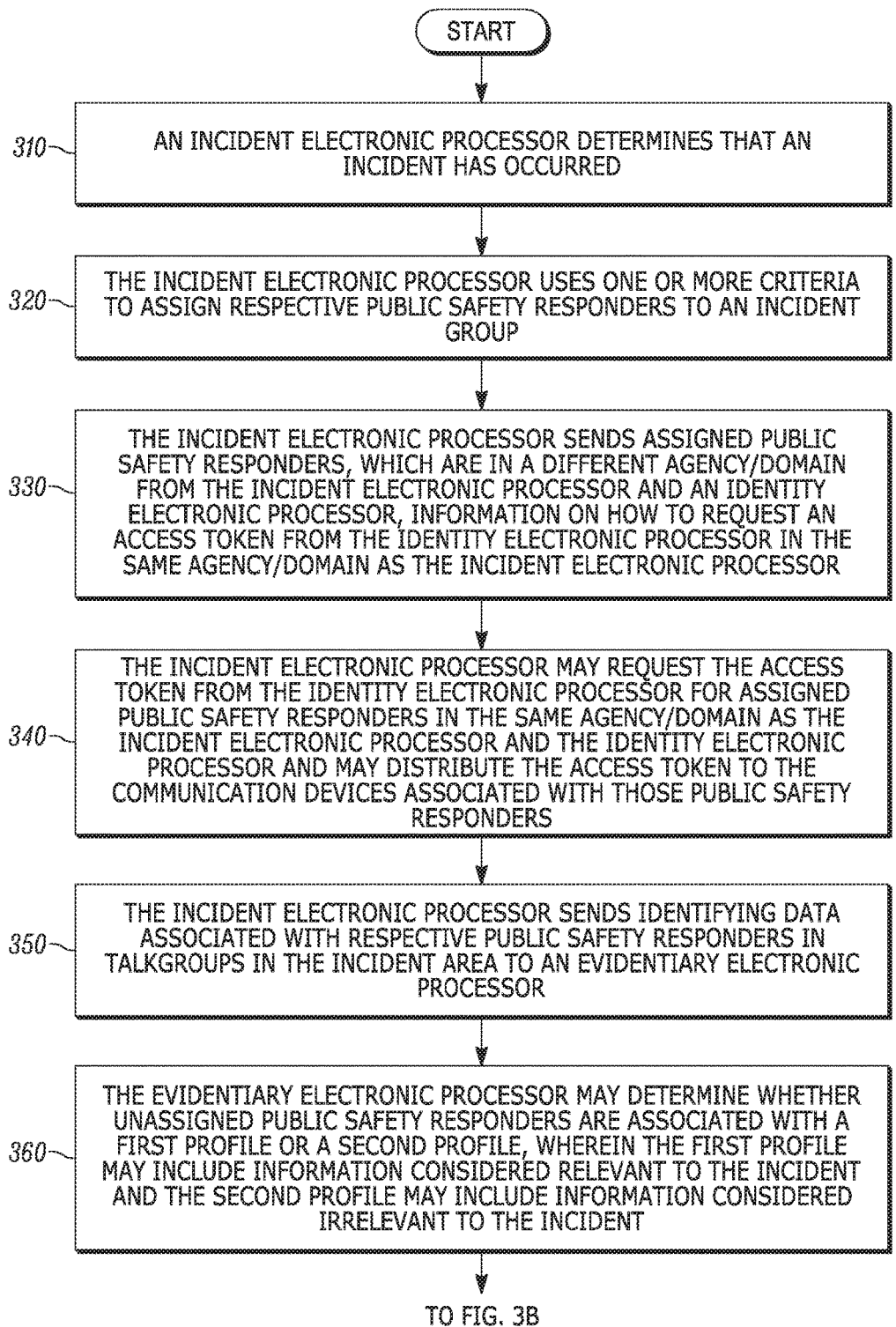
FIGS. 3A-3B are flowcharts of a method of creating assignment status for an incident in accordance with some embodiments.
Figure 3B:
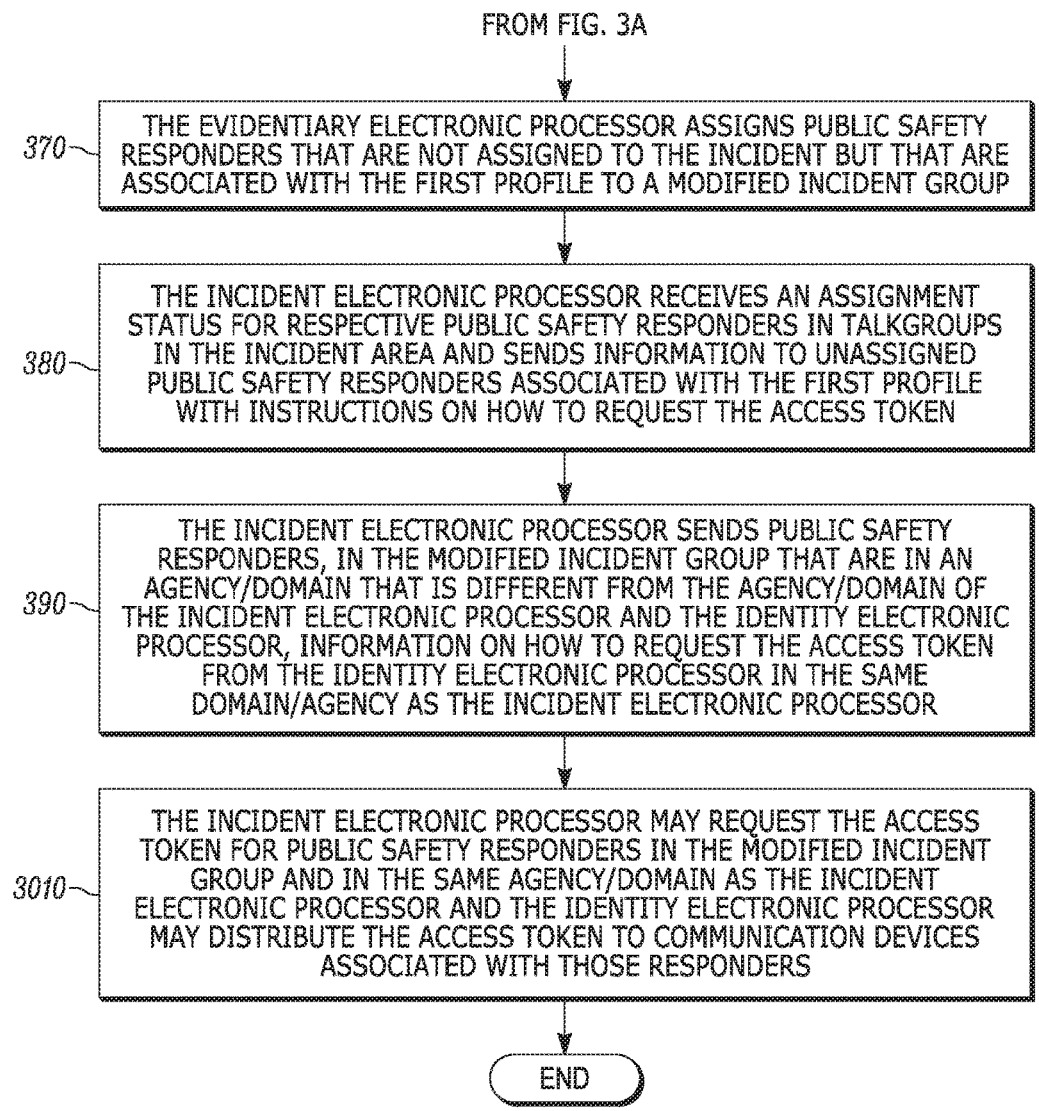

FIGS. 3A-3B are flowcharts of a method of creating assignment status for an incident in accordance with some embodiments. At 310, an incident electronic processor, for example incident electronic processor 102, determines that an incident has occurred. For example, the incident electronic processor may receive a report of the incident from communication devices in an incident area. At 320, the incident electronic processor uses one or more criteria to assign respective public safety responders to an incident group. At 330, the incident electronic processor sends assigned public safety responders, which are in a different agency/domain from the incident electronic processor and an identity electronic processor, for example identity electronic processor 104, information on how to request an access token from the identity electronic processor in the same agency/domain as the incident electronic processor.

At 340, the incident electronic processor may request the access token from the identity electronic processor for assigned public safety responders in the same agency/domain as the incident electronic processor and the identity electronic processor and may distribute the access token to the communication devices associated with those public safety responders. Communication devices associated with assigned public safety responders that are in a different agency/domain from the incident electronic processor may request the access token from the incident electronic processor themselves rather than have the incident electronic processor request the access token from the identity electronic processor, as performed in 340.

At 350, the incident electronic processor sends identifying data associated with respective public safety responders in talkgroups in the incident area to an evidentiary electronic processor, for example evidentiary electronic processor 106. At 360, the evidentiary electronic processor may determine whether unassigned public safety responders are associated with a first profile or a second profile, wherein the first profile may include information considered relevant to the incident and the second profile may include information considered irrelevant to the incident.

At 370, the evidentiary electronic processor assigns public safety responders that are not assigned to the incident but that are associated with the first profile to a modified incident group. At 380, the incident electronic processor receives an assignment status for respective public safety responders in talkgroups in the incident area and sends information to unassigned public safety responders associated with the first profile with instructions on how to request the access token. The information sent from the incident electronic processor may depend on whether the public safety responder is in the same agency/domain as the identity electronic processor. For example, when the unassigned public safety responders associated with the first profile is in an agency/domain that is different from the agency/domain of the incident electronic processor, the information may include instructions on how to request the access token from the identity electronic processor in the same agency/domain as the incident electronic processor.

At 390, the incident electronic processor sends public safety responders, in the modified incident group that are in an agency/domain that is different from the agency/domain of the incident electronic processor and the identity electronic processor, information on how to request the access token from the identity electronic processor in the same domain/agency as the incident electronic processor. At 3010, the incident electronic processor may request the access token for public safety responders in the modified incident group and in the same agency/domain as the incident electronic processor and the identity electronic processor may distribute the access token to communication devices associated with those public safety responders, wherein public safety responders associated with the modified incident group that are in a different domain from the incident electronic processor may request the second access token from the incident electronic processor themselves.

Figure 4:
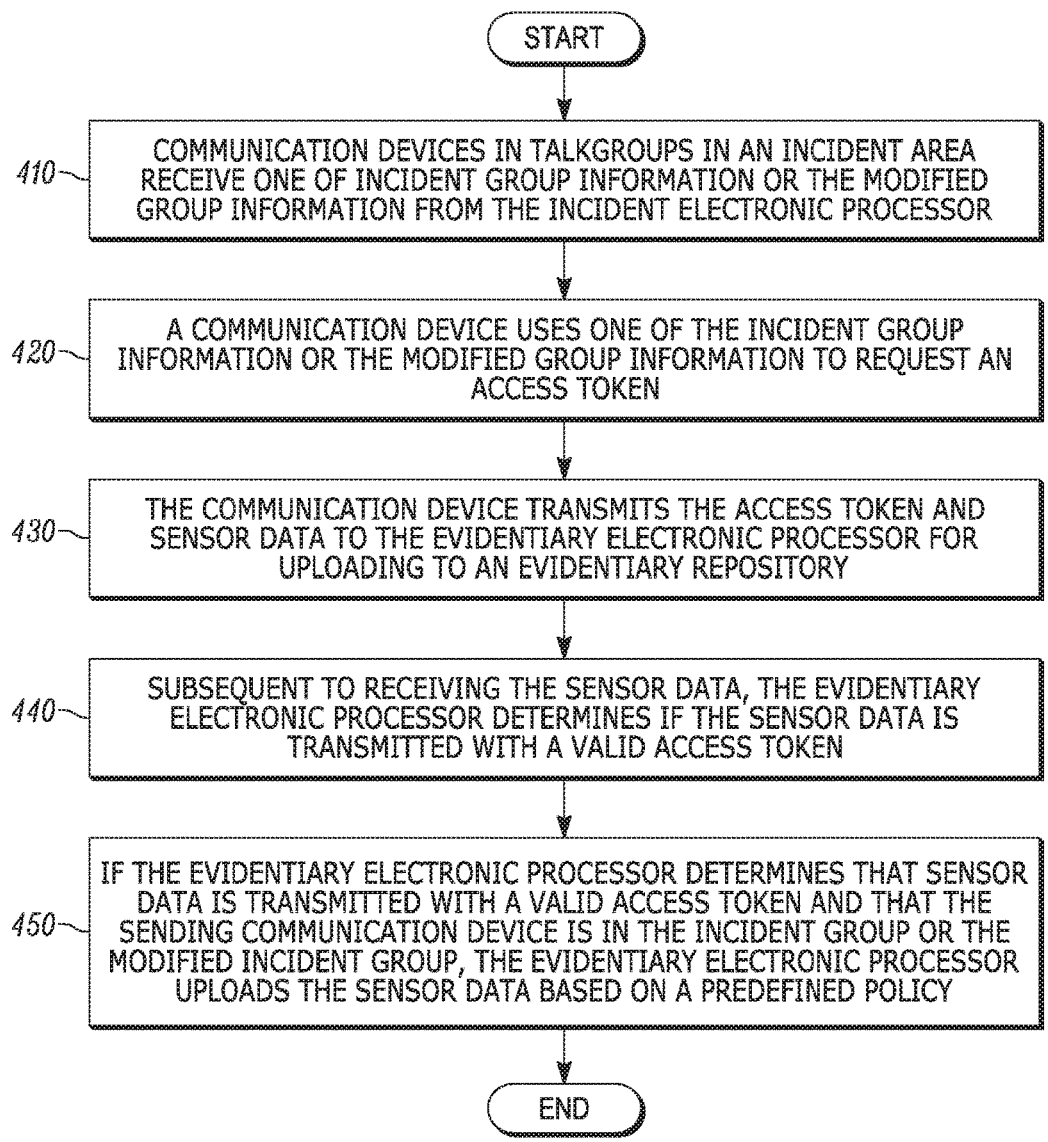
FIG. 4 is a flowchart of a method of collecting relevant data for an incident in accordance with some embodiments.

FIG. 4 is a flowchart of a method of collecting relevant data for an incident in accordance with some embodiments. At 410, communication devices in talkgroups in an incident area receive one of incident group information or the modified group information from an incident electronic processor, for example incident electronic processor 102. At 420, a communication device uses one of the incident group information or the modified group information to request an access token from an identity electronic processor, for example identity electronic processor 104 (the received information may include the actual address of the identity electronic processor and other information needed to request an access token).

At 430, the communication device transmits the access token and sensor data to an evidentiary electronic processor, for example evidentiary electronic processor 106 for uploading to an evidentiary repository, for example, evidentiary repository 108. At 440, subsequent to receiving the sensor data, the evidentiary electronic processor determines if the sensor data is transmitted with a valid access token. At 450, if the evidentiary electronic processor determines that sensor data is transmitted with a valid access token and that the sending communication device is in the incident group or the modified incident group, the evidentiary electronic processor uploads the sensor data based on a predefined policy. For example, the evidentiary electronic processor may disseminate the sensor data to communication devices in the incident area.

Figure 5:
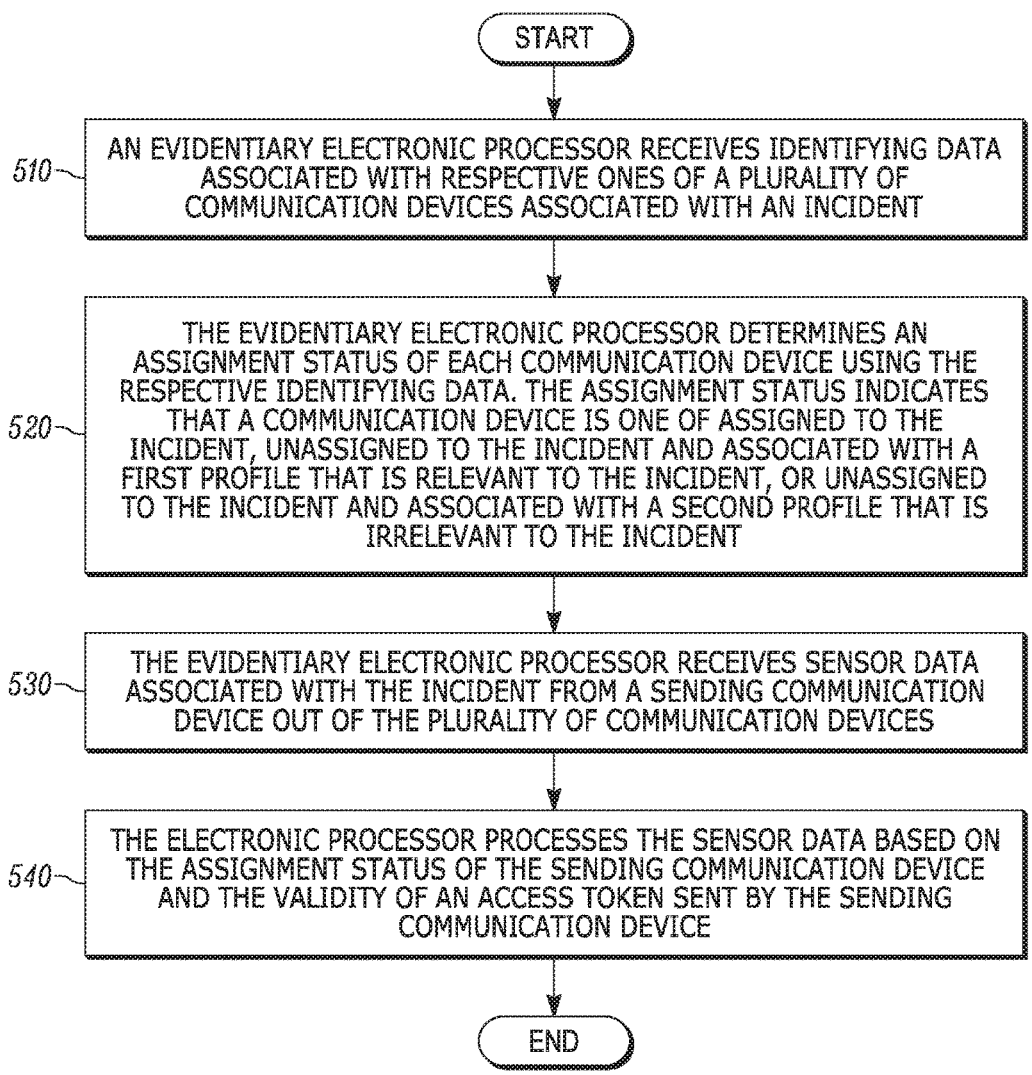
FIG. 5 is a flow diagram of a method of uploading relevant data for an incident in accordance with some embodiments.

FIG. 5 is a flow diagram of a method of uploading relevant data for an incident in accordance with some embodiments. At 510, an evidentiary electronic processor, for example evidentiary electronic processor 106, receives identifying data associated with respective ones of a plurality of communication devices associated with an incident. At 520, the evidentiary electronic processor determines an assignment status of each communication device using the respective identifying data. The assignment status indicates that a communication device is one of assigned to the incident, unassigned to the incident and associated with a first profile that is relevant to the incident, or unassigned to the incident and associated with a second profile that is irrelevant to the incident. At 530, the evidentiary electronic processor receives sensor data associated with the incident from a sending communication device out of the plurality of communication devices. At 540, the evidentiary electronic processor processes the sensor data based on the assignment status of the sending communication device and the validity of an access token sent by the sending communication device. For example, the evidentiary electronic processor uploads the sensor data to an evidentiary database based on the assignment status of the sending communication device and the validity of an access token sent by the sending communication device.

Figure 6:
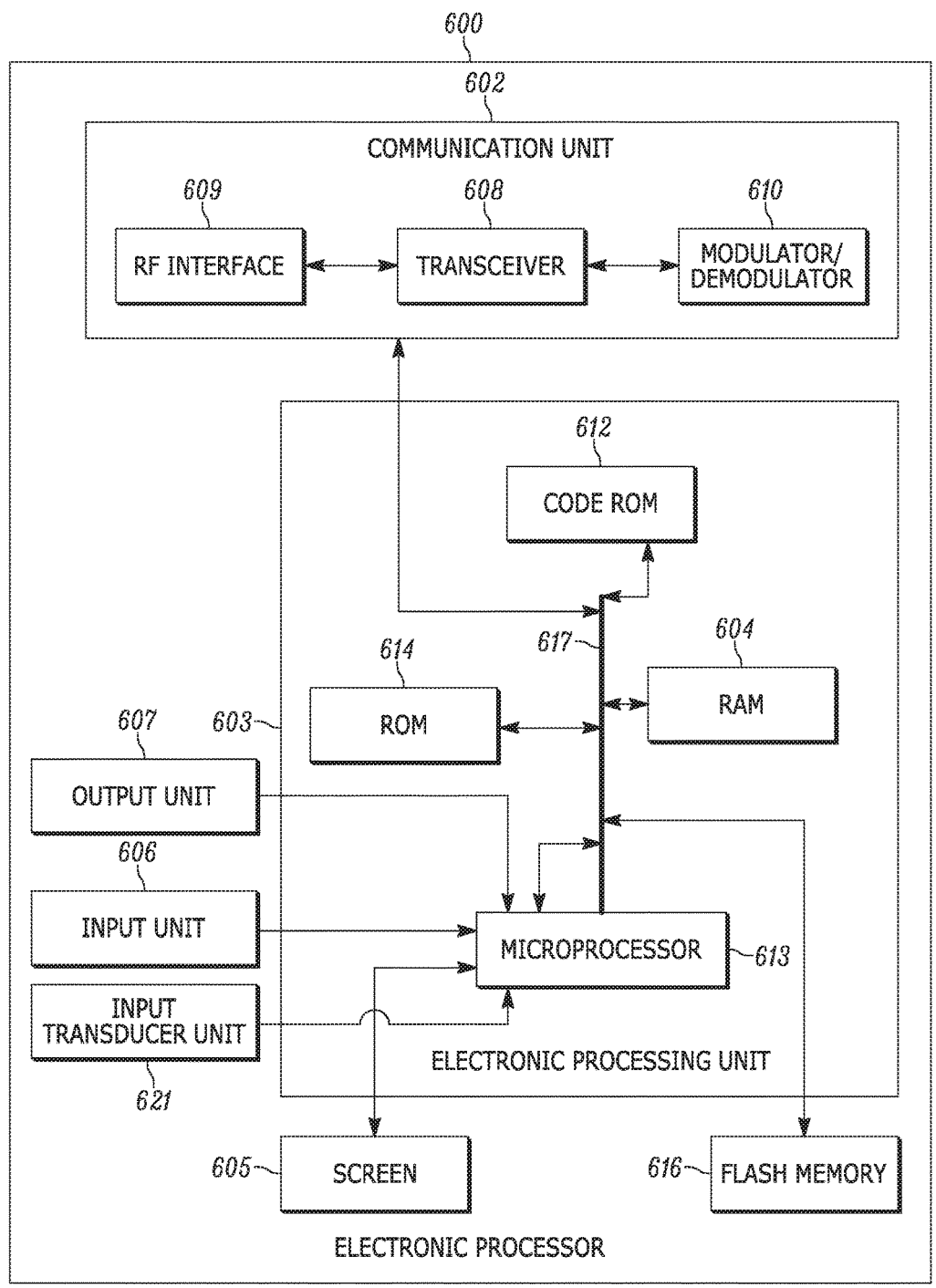
FIG. 6 is a block diagram of an electronic processor used in accordance with some embodiments.

FIG. 6 is a block diagram of the electronic processor 600, such as incident electronic processor 102, identity electronic processor 104 or evidentiary electronic processor 106, used in accordance with some embodiments. Electronic processor 600, for example, may include a communications unit 602 coupled to a common data and address bus 617 of an electronic processor/electronic processing unit 603. Electronic processor 600 may also include an input unit (e.g., keypad, pointing device, etc.) 606, an output transducer unit (e.g., speaker) 607, an input transducer unit (e.g., a microphone) (MIC) 621, and a display screen 605, each coupled to be in communication with the electronic processing unit 603.

The electronic processing unit 603 may include a code read-only memory (ROM) 612 for storing data for initializing system components of electronic processor 600. The electronic processing unit 603 may further include a microprocessor 613 coupled, by the common data and address bus 617, to one or more memory devices, such as a read only memory (ROM) 614, a random access memory (RAM) 604, and/or a static memory or flash memory 616. One or more of ROM 614, RAM 604 and flash memory 616 may be included as part of electronic processing unit 603 or may be separate from, and coupled to, the electronic processing unit 603.

Communications unit 602 may include an RF interface 609 configurable to communicate with network components and other user equipment within its communication range. Communications unit 602 may include one or more broadband and/or narrowband transceivers 608, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. Communications unit 602 may also include one or more local area network or personal area network transceivers perhaps operating in accordance with an IEEE 802.11 standard (e.g., 802.11a, 802.11b, 802.11g), or a Bluetooth transceiver. The transceivers may be coupled to a combined modulator/demodulator 610. The one or more memory devices 612, 614 and 616 are configured to store non-transitory computer-executable instructions to perform a set of functions such as one or more of the steps set forth in FIGS. 3-5.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving, by an evidentiary electronic processor, identifying data associated with respective ones of a plurality of communication devices associated with an incident;
   determining, by the evidentiary electronic processor, an assignment status of each communication device using respective identifying data, wherein the assignment status indicates that a communication device is one of assigned to the incident, unassigned to the incident and associated with a first profile that is relevant to the incident, or unassigned to the incident and associated with a second profile that is irrelevant to the incident;
   receiving, by the evidentiary electronic processor, sensor data associated with the incident from a sending communication device out of the plurality of communication devices; and
   processing, by the electronic processor, the sensor data based on a respective assignment status associated with the sending communication device.

2. The method of claim 1, wherein the receiving identifying data comprises receiving one or more of identifiers associated with communication devices, the assignment status associated with each communication device, an identifier for the incident, a type of the incident, a location of the incident, geographic locations of communication devices, capabilities of communication devices, tokens, and one or more of public safety responders identifiers, talkgroup identifiers, roles and agencies assigned to the incident.

3. The method of claim 1, wherein the determining the assignment status comprises sending the assignment status to a dispatcher, wherein the dispatcher informs the sending communication device on how to request an access token, depending on whether the assignment status indicates that the sending communication device is one of assigned to the incident or unassigned to the incident and associated with the first profile, wherein the access token is used to authorize the sending communication device to upload data to an evidentiary repository.

4. The method of claim 1, wherein the sensor data is transmitted with an access token that is used to authorize one or more of the sending communication device or a public safety responder associated with the sending communication device and with meta-data including one or more of a talkgroup identifier, location information, context information, an incident identifier, a public safety responder identifier and agency information.

5. The method of claim 1, wherein the processing comprises determining that the sensor data is transmitted with a valid access token and that the assignment status indicates that the sending communication device is one of assigned to the incident or unassigned to the incident and associated with the first profile.

6. The method of claim 1, further comprising calculating an evidentiary reliability index for the sensor data.

7. The method of claim 1, wherein the processing comprises uploading the sensor data to an evidentiary repository with one or more of an evidentiary reliability index and meta-data including one or more of a talkgroup identifier, location information, context information, an incident identifier, a first responder identifier and agency information.

8. The method of claim 1, wherein the determining the assignment status comprises sending the assignment status to a dispatcher, wherein the dispatcher sends information to communication devices assigned to the incident and in a domain that is different from the domain of the dispatcher and to communication devices unassigned to the incident, associated with the first profile and in a domain that is different from the domain of the dispatcher, wherein the information is on how to request an access token from an identity electronic processor in a same domain as the dispatcher.

9. The method of claim 1, wherein the determining the assignment status comprises sending the assignment status to a dispatcher,
   wherein the dispatcher requests an access token for communication devices assigned to the incident and in a same agency as the dispatcher and for communication devices unassigned to the incident, associated with the first profile and in the same agency as the dispatcher and distributes the access token to the communication devices assigned to the incident and in the same agency and to communication devices unassigned to the incident, associated with the first profile and in the same agency.

10. The method of claim 1, wherein the processing comprises discarding the sensor data when assignment status of the sending communication device is unassigned to the incident and associated with the second profile.

11. The method of claim 1, wherein the processing comprises executing one or more predefined policies including:
    disseminating the sensor data to communication devices in an incident area if an evidentiary reliability index associated with the sensor data is above a first threshold; and
    transmitting the sensor data via direct mode to communication devices within a predefined vicinity of the sending communication device if the evidentiary reliability index associated with the sensor data is below the first threshold.

12. An electronic processor, comprising:
    a memory storing non-transitory computer-executable instructions; and
    a transceiver; wherein
    the electronic processor is configured to perform a set of functions in response to executing the non-transitory computer-executable instructions, the set of functions including:
      receiving, via the transceiver, identifying data associated with respective ones of a plurality of communication devices associated with an incident;
      determining an assignment status of each communication device using respective identifying data, wherein the assignment status indicates that a communication device is one of assigned to the incident, unassigned to the incident and associated with a first profile that is relevant to the incident, or unassigned to the incident and associated with a second profile that is irrelevant to the incident;
      receiving, via the transceiver, sensor data associated with the incident from a sending communication device out of the plurality of communication devices; and
      processing the sensor data based on a respective assignment status associated with the sending communication device.

13. The electronic processor of claim 12, further configured to send the assignment status to a dispatcher, wherein the dispatcher informs the sending communication device on how to request an access token, depending on whether the assignment status indicates that the sending communication device is one of assigned to the incident or unassigned to the incident and associated with the first profile, wherein the access token is used to authorize the sending communication device to upload data to an evidentiary repository.

14. The electronic processor of claim 12, further configured to determine, when processing the sensor data, that the sensor data is transmitted with an access token and that the assignment status indicates that the sending communication device is one of assigned to the incident or unassigned to the incident and associated with the first profile.

15. The electronic processor of claim 12, further configured to determine an evidentiary level of the sensor data to the incident using an evidentiary reliability index.

16. The electronic processor of claim 12, further configured to notify communication devices associated with the incident subsequent to updating an evidentiary repository if the assignment status indicates that the sending communication device is one of assigned to the incident or unassigned to the incident and associated with the first profile.

17. The electronic processor of claim 12, further configured to discard the sensor data when assignment status of the sending communication device is unassigned to the incident and associated with the second profile.

18. A system comprising:
a first electronic processor configured to create an assignment status for communication devices associated with an incident, wherein the assignment status indicates whether a communication device is assigned to the incident or unassigned to the incident;
a second electronic processor configured to create and issue tokens for authorized communication devices associated with the incident; and
a third electronic processor configured to receive identifying data associated with respective ones of a plurality of communication devices associated with an incident, determine an assignment status of each communication device and determine if an unassigned communication device is associated with a first profile that is relevant to the incident or associated with a second profile that is irrelevant to the incident, receive sensor data associated with the incident from a sending communication device out of the plurality of communication devices, and process the sensor data based on a respective assignment status associated with the sending communication device.

19. The system of claim 18, wherein
the first electronic processor is configured to transmit identifying data associated with the communication devices to the third electronic processor and the third electronic processor is configured to determine the assignment status of each communication device using the identifying data; and
the second electronic processor is configured to generate an access token for communication devices assigned to the incident or unassigned to the incident and associated with the first profile and the third electronic processor is configured to check authorization of the communication devices by validating the access token.

20. The system of claim 18, wherein the third electronic processor is further configured to send the assignment status to the first electronic processor,
wherein the first electronic processor sends information to communication devices assigned to the incident and in a domain that is different from the domain of the first electronic processor and to communication devices unassigned to the incident, associated with the first profile and in a domain that is different from the domain of the first electronic processor, wherein the information is on how to request an access token from the second electronic processor in a same domain as the first electronic processor; and
wherein the first electronic processor requests the access token for communication devices assigned to the incident and in a same agency as the first electronic processor and for communication devices unassigned to the incident, associated with the first profile and in the same agency as the first electronic processor and distributes the access token to the communication devices assigned to the incident and in the same agency and to communication devices unassigned to the incident, associated with the first profile and in the same agency.

* * * * *